United States Patent Office 3,414,432
Patented Dec. 3, 1968

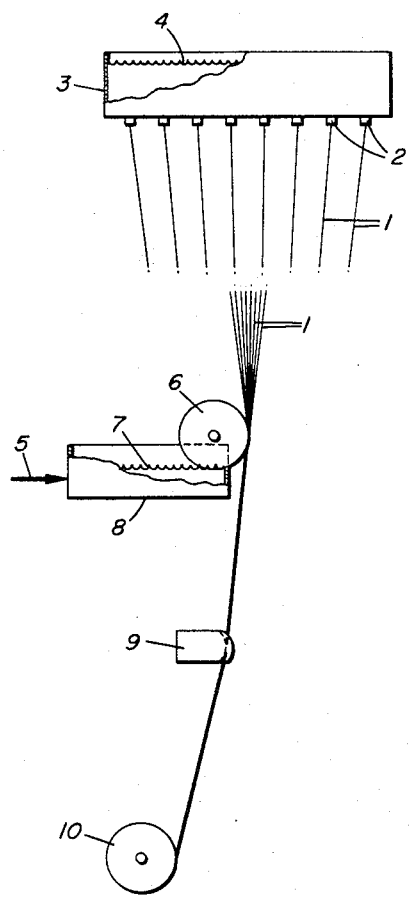
JOSEPH K. MERTZWEILLER
NEVILLE L. CULL
ROGER S. HAWLEY
INVENTORS
BY Joseph P. Burke
PATENT ATTORNEY

3,414,432
SIZING GLASS FIBERS WITH POLYBUTADIENE-DICARBOXYLIC ACID ANHYDRIDE AMINO SALT ADDUCTS
Joseph K. Mertzweiller, Baton Rouge, and Neville L. Cull, Baker, La., and Roger S. Hawley, Cranford, N.J., assignors to Esso Research and Engineering Company, a corporation of Delaware
Filed Oct. 4, 1965, Ser. No. 492,760
15 Claims. (Cl. 117—126)

This invention is directed to (A) a process for preparing sized glass fibers using substantially low or nonmigratory water-soluble polymeric binders which are selected from the group consisting of (1) organic amine or ammonium salts of unsaturated polycarboxylic acid anhydride adducts of low molecular weight butadiene homo- or copolymers, (2) the monoamide partial organic amine or ammonium salts of said adducts, and (3) the partial ester-partial organic amine or ammonium salts of said adducts; (B) the thus sized glass fibers; and (C) glass fiber laminates or other structures containing the sized glass fibers laminated with natural or synthetic elastomers, plastics, resins, etc., e.g., thermoplastic resins, thermosetting resins, etc.

More specifically the present invention is directed to glass fibers of improved properties (e.g., workability into woven fabric, strands, twisted multistrand reinforcing members; adhesion compatibility with laminating resins, molding resins, etc.) due to a substantially uniform coating thereon of a water-soluble, substantially nonmigratory, polymeric binder selected from the group consisting of (1), (2) or (3) above. The term "polybutadiene copolymer" as used herein is intended to include copolymers of butadiene with one or more comonomers polymerizable therewith, e.g., styrene, acrylonitrile, isoprene, methyl styrene, piperylene, acrylate esters, etc.

These water-soluble polymer adduct salts, monoamide derivatives, and partial esters can have molecular weights (number average) ranging from about 500 to about 6,000. The butadiene homo or copolymer, per se, from which these adduct salts, etc., are produced can have molecular weights (number average) ranging from about 300 to about 4,000. Structurally speaking the water-soluble ammonium or organic amine polymer salts (1) can be visualized as having a polybutadiene polymer backbone with pendant polyfunctional groups each of which contains one or more organic amine or ammonium salt group resulting from the hydrolysis of the anhydride group of the adduct followed by the ammonium or organic amine salt formation by reacting the ammonium compound or organic amine with the hydrolyzed adduct. A representative segmental structure of the water-soluble organic amine or ammonium salts (1) above is given below (where the unsaturated polycarboxylic acid anhydride used to form the adduct is maleic anhydride):

(1)
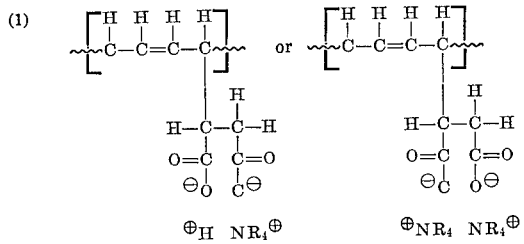

where the R groups can be hydrogen, hydroxyl, alkyl, aryl, alkaryl, aralkyl, alkenyl or heterocyclic organic groups. In the representation of (1) above, both the mono- and di-neutralized organic amine or ammonium salts have been shown. The partial salt-partial acid is formed using half the stoichiometric amount of ammonium compound or organic amine employed to form the di salt derivative. Hence only half the carboxyl groups are neutralized resulting in partial salts.

The monoamide-partial organic amine derivatives (2) of the butadiene polymer-unsaturated polycarboxylic acid anhydride adducts are formed by directly reacting the adduct (preferably in the absence of oxygen) with the organic amine (primary and secondary amines being suitable for this purpose) without previous hydrolysis. This procedure results in water-soluble monoamide-partial organic amine salts which can be visualized as having the below segmental structure (also showing maleic anhydride as the unsaturated polycarboxylic acid anhydride):

(2)
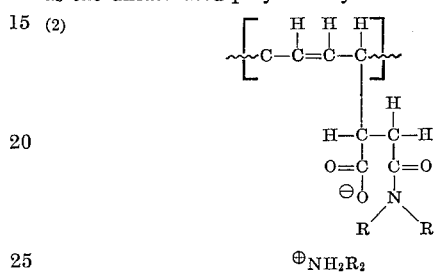

where the R groups are as defined above, with the proviso that said monoamide is formed using a primary or secondary organic amine.

According to another embodiment (3) of the present invention, the water-soluble binder can be a partial (mono) ester of said adducts formed by reaction of an organic alcohol with the butadiene polymer-anhydride adduct (preferably in absence of oxygen) at temperatures of about 70 to 480° F. (and usually at temperatures of about 140 to 300° F.) followed by neutralization with an organic amine or ammonium compound at the same temperatures (70 to 480° F.) to form the water-soluble partial ester-partial organic amine or ammonium salt of the butadiene polymer-unsaturated polycarboxylic acid anhydride adducts. These water-soluble derivatives can be visualized as having the following segmental structure (where maleic acid is the unsaturated acid anhydride):

(3)
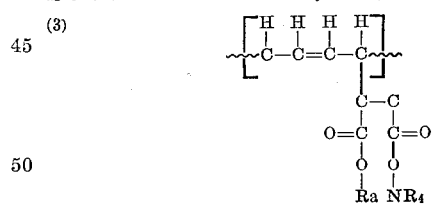

where Ra is the organic group of the organic alcohol and the R groups are as indicated above with respect to (1) and (2).

As will be noted from the above representative structures (1), (2), and (3), all three water-soluble derivatives have at least one (NR$_4$), (NH$_2$R$_2$) or (NH$_4$) group. The monoamide derivatives (2) differ from the ammonium or organic amine salts (1) primarily in having one amide group rather than the salt or acid group of (1) or the Ra ester group of (3). In all three water-soluble derivatives, the butadiene polymer backbone retains its original unsaturation; the unsaturation of the maleic anhydride is lost (due probably to an allylic addition reaction during adduct formation), and the heterocyclic anhydride linkage is opened during salt formation.

All three of these derivatives contain the abovementioned pendant polyfunctional groups in a degree of substitution ranging from about 0.5 to 10 and usually about 1 to 5 such pendant polyfunctional groups per molecule of polymer.

In the above representative structures (1), (2) and (3) the R groups can be hydrogen, hydroxyl, alkyl, aryl, alkaryl, alkenyl or heterocyclic organic groups. The alkyl and alkenyl group(s) or moieties (when present) can be linear (straight) or branched chain or cyclic (saturated or unsaturated). The aryl groups or moieties (when present) can be mono or polynuclear, but usually are mononuclear. When one or more of the R groups is organic the total number of carbon atoms in the four R groups can range from 1 to 60 carbon atoms (and more usually from 1 to 20 carbon atoms) with each organic R group containing from 1 to 20 and usually from 1 to 12 carbon atoms.

The aqueous glass fiber sizing compositions containing the water-soluble binders employed in accordance with this invention can be used as forming sizes (viz, to aid in forming strands by application to freshly drawn filaments) or finishing sizes (viz, to aid in subsequently working of previously formed strands, e.g., by weaving into cloth, twisting into larger multistrand units or other compositing operations) or both.

When used as a forming size, the above polymer salts can be applied to the glass filaments readily by rollers, belts, dipping or any such suitable application procedure.

A glass fiber strand is composed of a multitude of fine glass filaments which are formed by being drawn at a high rate of speed from molten cones of glass located on the tips of small orifices in a bushing, such as shown for example in U.S. Patent 2,133,238. During formation, the filaments are coated while moving at a rapid speed (of the order of 5 to 20,000 ft./min.) with a sizing composition which contains a binder to give the strand integrity for workability, i.e., for twisting, plying, and weaving. If the strand does not have proper integrity, fuzzing occurs during the operations due to filament breaking and eventually the strand is weakened and readily subjected to breaking. The size can also contain a lubricant for the individual filaments to prevent destruction of the strand by abrasion of the individual filaments against each other or against fiber handling equipment during fabrication of the strands. When the glass fibers are to be laminated or molded, it is also desirable to incorporate in the sizing composition a coupling agent to assist in obtaining greater adhesion between the glass fiber and the laminating or molding resin or elastomer. This also serves to increase the flexural strength of the glass fiber-resin composite articles.

A number of organic silane and siloxane materials have been found to be useful as coupling agents. For example, halogenated or nonhalogenated vinyl and allyl-containing, alkyl-, alkoxy-, alkenyl-, aminoalkyl-, aminoalkoxy-, acyl-oxy, alkenyl acyloxy and similar silanes, their hydrolysis products and polymers of the hydrolysis products are suitable for such use. Some of these suitable silane coupling agents are disclosed in U.S. Patents 2,563,288; 2,688,006; 2,688,007; 2,723,211; 2,742,378; 2,754,237; 2,776,910 and 2,799,598.

In the sizing of glass fibers it is desirable whenever possible to employ a water-soluble or a water dispersible binder in the size, in order to avoid the dangers and costs involved in employing organic solvents to distribute the binder on to the glass fibers.

The use of water-dispersions of binders although desirable usually presents problems. Usually when employing such water-dispersions of binders, it is necessary to incorporate an emulsifying or dispersing agent in varying amounts based on binder present in the size in order to keep the dispersed polymers or resins suspended sufficiently to enable proper application of the size to the glass fiber filaments as they are being drawn. Moreover, frequently difficulty is encountered in obtaining proper compatibility of the emulsifying or dispersing agent with the silane or other coupling agent employed to assist in securing proper adhesion between the glass fibers and the binder placed thereon.

Another problem encountered in the use of the water-soluble or water dispersable binders in aqueous glass fiber forming or finishing sizes is the migration of the binder from the glass fibers during the drying thereof (e.g., as occurs in the oven or air drying of sized glass fiber filaments and/or strands as they are mounted on a forming package). The binder has a tendency to migrate or move outwardly from the center of the forming package to the outside thereof along with the water during drying so that the sized glass fiber filaments and/or strands in the interior of the forming package can have a substantially less uniform distribution and concentration of size thereon compared to those at the outside of the glass forming package. This causes problems in working, e.g. weaving, the sized fibers into cloth or in grouping individual strands into larger strands suitable for use as reinforcing members. The difficulties are encountered by nonuniform films and concentrations of size on the strands from the interior to the exterior of the forming package. Thus strand fuzzing, breakage, and other deleterious effects frequently occur due to the migration of the water-soluble binder or water dispersions of binder on the glass-forming package during drying. This can lead to unfavorable color variations after coronizing, (esp. with regard to woven glass fabric) which can result in rejects or a substantial diminishing in the quality of the glass fabric.

Another problem frequently encountered in the use of aqueous glass fiber sizes containing water-soluble polymers and/or resins as binders is that it frequently becomes necessary to use a comparatively large concentration of the water-soluble polymer in the aqueous solution and on the glass fibers in order to insure the distribution of a proper minimum film thickness on the glass fiber filaments and/or strands after drying in order to protect them during the subsequent strand twisting, weaving grouping or other compositing operations. This increases the cost of the sizing operation and generally accentuates the migration problem referred to hereinabove.

According to the present invention, these and other vexatious problems can be substantially eliminated or minimized by employment of an aqueous glass fiber size containing as the essential binder component water-soluble organic amine or ammonium salts (1), (2) or (3) as set forth hereinabove, or unsaturated polycarboxylic acid anhydride adducts of butadiene polymers and copolymers.

Another advantageous feature of this invention resides in the fact that less water-soluble polymer binder is required according to the present invention to accomplish the same and even superior binding power in holding the individual glass fiber filaments together during fabrication than is required using conventional water-soluble polymeric latices and other conventional water-soluble binders. Thus substantial economies can be achieved in accordance with the present invention without sacrificing binding strength; and at the same time enhanced properties can be achieved such as those mentioned above, e.g., reductions in size migration, attainment of better strand integrity, attainment of more uniform adhesion between the glass fiber strands, and between the sized strands and the laminating rubber, plastic, or resin material which they are employed to reinforce. Another desideratum achieved by this invention is that these water-soluble binders protect against filament breakage (as evidenced by strand fuzziness) while at the same time allowing filament separation to allow ready access of individual filaments to the subsequent rubber or other coating applied to the fibers to aid in separating them thereby reducing abrasion between fibers when the glass fibers are in place as reinforcements, e.g. for molded or laminated plastic articles. Unsized strands separate readily, but the filaments thereof break badly and the unsized strands are unsatisfactory.

The water soluble polymeric compositions, whose use is contemplated in accordance with this invention, are prepared readily by thermally reacting the butadiene homo- or copolymer having a molecular weight of about 300 to about 4,000 with the unsaturated polycarboxylic acid anhydride at temperatures of about 250 to about 500° F. to form the butadiene-anhydride adducts. Usually a mono or poly unsaturated unsubstituted or inertly substituted dicarboxylic acid anhydride is employed to form the adducts preferably at temperatures of about 300 to 500° F. Suitable exemplary unsaturated dicarboxylic acid anhydrides which can be used include, but are not limited to, the following: maleic anhydride, itaconic anhydride, cyclohexene carboxylic anhydride, viz.,

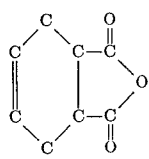

cyclopentadiene carboxylic anhydride, viz,

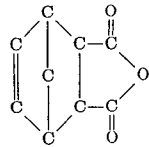

"chlorendic" anhydride, viz,

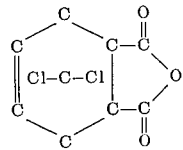

etc.

The butadiene homo- or copolymers from which the adducts are prepared can have molecular weights of about 300 to 4,000. These homopolymers and copolymers can be prepared readily by reacting butadiene with or without a suitable copolymerizable monomer at temperatures of —50° F. to +200° F. in the presence of conventional polymerization catalysts. Such catalysts as dispersions of alkali metals, e.g. Li, Na, K, etc., or alkyl derivatives of alkali metals can be used as polymerization temperatures ranging from about —50 to 200° F., and more usually from 0 to 150° F. A suitable ether, e.g. dioxane or tetrahydrofuran can be used to enhance the activity of the polymerization reaction; the ether or a mixture of ether and a hydrocarbon can be the polymerization medium.

Suitable copolymerizable monomers which can be employed to form polybutadiene copolymers include, but are not limited to, the following: styrene, methyl styrene, acrylonitrile, acrylate esters, e.g. methyl acrylate, ethyl acrylate, propyl acrylates, butyl acrylates, 2-ethyl hexyl acrylate; the corresponding hydroxyalkyl acrylates; etc.

According to another embodiment of this invention, water-soluble polymeric compositions are prepared and employed which are essentially the same as (1), (2), and (3) above except that they contain on the butadiene polymer backbone one terminal mononuclear aromatic chain transfer function as depicted in the below representative segmental structure (where the anhydride is maleic anhydride):

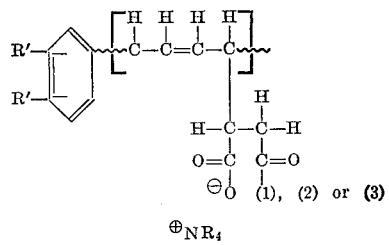

where the R' groups can be H or a $C_1$ to $C_8$ alkyl group (when one R' group is H and the other is alkyl, e.g., $CH_3$, the R' alkyl, can be ortho-, meta-, or para-), and the R groups are as set forth above with respect to (1), (2) and (3).

These polymer salts containing the terminal mononuclear aromatic group can be prepared readily by conducting the polymerization of the butadiene homo- or copolymer in the presence of from about 10 to about 60 wt. percent toluene, isomeric xylenes, or other suitable alkylated mononuclear aromatic compound, thereby resulting in the preparation of polymers containing one mononuclear aromatic terminal chain transfer function per molecule of polymer. Then, this terminal chain transfer function-containing polybutadiene backbone polymer is subjected to adduct formation with a suitable unsaturated dicarboxylic acid anhydride, and reaction with an organic amine or ammonium salt with (1) or without (2) prior hydrolysis or partial esterification (3) using an Ra alcohol (in the same manner referred to hereinabove).

The butadiene polymer (with or without a terminal mononuclear aromatic chain transfer group) is reacted thermally (and usually noncatalytically) with from 5 to 50 weight percent of an unsaturated polycarboxylic acid anhydride at temperatures of about 250 to 500° F. to yield butadiene-anhydride adducts. Preferably an unsaturated dicarboxylic acid anhydride is employed at temperatures usually ranging from 300 to 500° F. in amounts of from about 10 to 40 wt. percent. (based on butadiene polymer). This reaction results in the formation of the butadiene-unsaturated anhydride adducts. These butadiene homo- and copolymer-unsaturated polycarboxylic acid anhydride adducts, per se, prepared as above can be visualized as having the following representative segmental structures (where the unsaturated polycarboxylic acid anhydride is maleic anhydride, and the backbone polymer is a polybutadiene homopolymer):

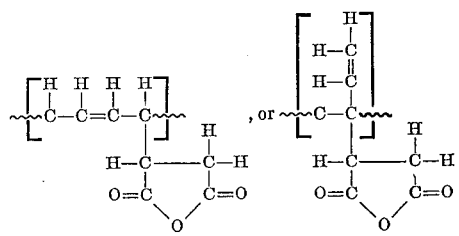

Subsequent to formation of said adducts, the derivatives (1), (2), and (3) can be formed therefrom readily by reaction with an organic amine or ammonium compound (preferably in the absence of $O_2$) at temperatures of about 32 to 480° F. and pressures of 0.5 to 20 atmospheres (usually from about 120 to 400° F. and 0.5 to 5 atmospheres).

When forming organic amine or ammonium salts (1) the adduct is hydrolyzed with water. This hydrolysis is usually conducted preferably in the absence of oxygen at temperatures of 50 to 212° F., and can be done conveniently at ambient room temperatures (60 to 85° F.). The hydrolysis and neutralization with the organic amine or ammonium compound can be done simultaneously by including at least about 15 wt. percent and preferably at least about 18 wt. percent water in the neutralization reaction mixture of polymer adduct and organic amine or ammonium compound. Usually this combined hydrolysis-neutralization is conducted preferably in the absence of oxygen by contacting the polymer adduct with 5 to 50 wt. percent of an organic amine (or ammonium compound) in water.

When forming monoamide derivatives (2), as noted above the polymer adduct is directly reacted with the primary or secondary organic amine at 70 to 480° F. without hydrolysis, viz., under substantially anhydrous conditions.

When forming partial Ra ester-partial organic amine or ammonium salts (3), the polymer adduct is reacted preferably in the absence of oxygen with an organic alcohol at temperatures of about 70 to 480° F. and the resulting partial ester is reacted preferably in the absence of oxygen with an organic amine or ammonium compound at temperatures within the same range. A wide variety of organic alcohols can be used including primary, secondary, and tertiary, mono or polyhydric alcohols; e.g., straight chain-, branched chain-, and cyclo-alkyl alcohols; straight chain-, branched chain- and cycloalkenyl alcohols; aromatic alcohols, which can be unsubstituted or inertly substituted. Usually the organic alcohol employed contains from 1 to 20 carbon atoms. Suitable exemplary organic alcohols which can be used include, but are not limited to, the following: methanol; ethanol; n-propyl and isopropyl alcohols; n-butyl, iso-butyl and tert.-butyl alcohols; allyl alcohol; n-hexyl alcohol; cyclohexanol; hexanol; cyclohexenol, heptanol; octanols; nonyl alcohols; decyl alcohols; undecanol; dodecanol; tridecanol; tetradecanol; pentadecanol; hexadecanol; octadecanol; eicosanol; etc.

The reaction of the organic amine or ammonium compound with the polymeric adduct (hydrolyzed or unhydrolyzed, partly esterified or not) can be conducted readily by reacting said polymer adduct in the absence of oxygen with a suitable organic amine or ammonium compound at temperatures of 32 to 480° F. (usually from about 120 to about 400° F.) using substantially atmospheric pressure. Suitable exemplary organic amines, the use of which is contemplated herein, to prepare the water-soluble amine salts of the above indicated polymers include, but are not limited to, the following types of amines: primary, secondary and tertiary aliphatic, alicyclic, aryl amines, alkaryl amines, alkenyl amines, aralkyl amines, and heterocyclic amines, (the latter which can contain oxygen, nitrogen and carbon in the ring) of which types the following amines can be listed as exemplary: methyl amine, ethyl amine, propyl amine, n-butyl amine, isobutyl amine, tert-butyl amine, n-, iso-, and tert-amyl amines, n-hexyl amine, cyclohexyl amine, n-heptyl amine, n-octyl amine, n-nonyl amine, decyl amines; N, N-dimethyl amine, N,N-diethyl amine and the corresponding secondary and tertiary aliphatic alkyl amines, e.g. trimethyl amine, triethyl amine, etc.; N,N-dimethyl cyclohexyl amine, N,N-diethyl cyclohexyl amine, and the corresponding alicyclic alkyl amines wherein one or more of the alkyl groups is alicyclic; hydroxy containing and hydroxy-substituted aliphatic and alicyclic primary, secondary and tertiary amines, e.g., N,N-dialkyl hydroxy amines, ethanol amine, alkyl monoethanol amines, triethanol amine, etc.; phenyl amine, diphenyl amine, triphenyl amine; N,N-diethyl phenyl amine, N,N-methyl phenyl amine; N,N-diphenyl methyl amine; N,N-butyl cyclohexyl amine; N,N-dibutyl cyclohexyl amine; N,N-dicyclohexyl ethyl amine; allyl amine, diallyl amine, triallyl amine; tolyl amine, ditolyl amine, tritolyl amine; benzyl amine, dibenzyl amine; tribenzyl amine, N,N-dimethyl benzyl amine; ethylene imine, piperidine, 1-methyl pyrrolidine, aniline, morpholine, hexamethyleneimine; pyridine; etc. Suitable exemplary ammonium compounds which can be employed to produce ammonium salts of the above polymers include, but are not limited to, the following: ammonium hydroxide, gaseous ammonia, benzyl trimethyl ammonium hydroxide, tetramethyl ammonium hydroxide, tetraethyl ammonium hydroxide, tetraethanol ammonium hydroxide, etc. When forming monoamide derivatives, a primary or secondary organic amine is used as mentioned hereinabove.

The glass fiber sizing composition is then formed by dissolving the above described water-soluble organic amine or ammonium polymer salts in a suitable amount of water to which the silane or other suitable coupling agent is added. The weight concentration of the aforementioned water-soluble binders in the aqueous glass fiber sizing compositions can range from about 0.1 to about 10 wt. percent in accordance with this invention. Usually the concentration of binder in this size ranges from about 0.2 to about 5.0 wt. percent and more preferably about 0.3 to 4 wt. percent. The specific preferred concentration of binder will depend upon the specific organic amine or ammonium salt used, the molecular weight and nature of the butadiene polymer, the specific polycarboxylic acid anhydride used, and other related factors. The manner of applying the aqueous glass fiber sizes containing the water-soluble polymer salt binder to the individual fibers will be discussed hereinbelow explaining the use of said sizes as forming sizes in conjunction with the sole figure of the drawing.

The figure of the drawing illustrates a schematic view of applying sizing solution to the individual fibers during their formation. The sizing solution is applied to the individual fibers 1 just after their emergence from orifices 2 in an electrically heated, platinum or other suitable bushing 3 containing molten glass 4. The sizing solution is applied to the filaments prior to or at the same time as they are grouped together to form a strand by means of the roller or other suitable applicator 5 which is composed of a rotating roller 6 partially submerged in the sizing solution 7 containing a suitable reservoir 8. Such an applicator can be of the roller type such as shown in U.S. Patent No. 2,728,972. The fibers are grouped into individual strands by a suitable graphite or other guide 9 and wound around a forming tube 10 rotating at approximately 78,000 r.p.m. to produce a strand travel approximately 12,000 to 15,000 ft./min. Other methods of applying the size to the glass fiber filaments and/or strands such as a pad applicator, a flexible band applicator biased on a two or three roller system, etc., can be employed; and the strand may be formed by means other than winding on the forming tube, such as by means of a pair of rotating wheel pullers which direct the strand on to a suitable collecting device.

The glass fiber strands wound on the forming tube 10 are then subjected to a drying operation. This can be done by heating them while on the forming tube at temperatures and for time periods sufficient to remove substantially all the water therefrom. For example, the sized glass fiber strands on the forming tube can be heated at temperatures ranging from about 200 to 320° F. and usually about 230 to 300° F. and more preferably from about 250 to 280° F. for time periods ranging from 2 to about 10 hours. This drying also causes the silane coupling agent to fix itself to the glass surface, and assists the binder in producing the proper extent of trand integrity required for subsequent working or forming operations wherein the strand can be woven into fabric or fabricated into larger strands.

The average solids content of the size on the dried strand can range from 0.05 to 4.0 wt. percent. Usually, however, the solids content ranges from about 0.1 to 2.0% by weight. It is an advantage of this invention that the size on the dried glass fiber strands is more uniformly distributed (as a smooth film) throughout the extent of the strands on the forming tube. This assists in attaining a more uniform adhesion between the sized strand and the laminates or molded articles comprising the resin or plastic reinforced thereby. Uniformity of the finish is also important on glass fibers (or woven fabric) which is to be dyed. The present invention has other compositional and processing advantages. For example, the use of the glass fiber sizing process and compositions in accordance with this invention obviates the need for emulsifiers in the forming or finishing size. This allows the avoidance of unstable sizing solutions due to adverse solubility effects between the silane or other coupling agent and any such emulsifiers. Furthermore by practice of this invention less water-soluble binder can be used to accomplish the same or even superior binding power. This has a distinct economic advantage plus the added advantage of improving contact between the coupling agent and the glass surface. Since there is much less water-soluble binder required than is conventionally employed in glass fiber sizing compositions, the coupling agent has a much better opportunity to contact the glass surface and react with it. This is especially important when the sized glass fibers are to be laminated or serve as reinforcement for rubber, plastic, resin, or similar molded members because the silane coupling agent in the size chemically links the sized glass fibers with the rubber, plastic, or resin being reinforced during the vulcanization or curing period. Thus the better the access, reaction and linkage of the coupling agent to the glass, the stronger will be the chemically linked bridge between the glass fibers and the rubber, plastic, resin, etc. This results in increased adhesion between the sized fibers and the rubber, plastic or resin when the laminate or molded article is cured.

The above description concerns the use of these polymer salts as glass fiber forming sizes. These polymer salts can also be used as finishing sizes (as will be evident from the below examples) e.g., a size applied to previously coronized woven or unwoven glass fibers to impart desired properties to said fiber for subsequent working or handling operations or in the finished product, itself. The manner of applying the sizing compositions when they are used as finishing sizes is similar to that employed in applying forming sizes, viz., by roller, pad, etc., from aqueous solution onto the glass fibers.

The present invention will be illustrated in greater detail by the following examples which are included herein as illustrative of the present invention, and should not be considered limiting thereon.

Example 1.—Preparation of typical adduct partial ester salts from butadiene polymer having chain transfer function A low molecular weight polybutadiene homopolymer averaging one terminal phenyl group was prepared by sodium initiated polymerization of butadiene in a reaction medium consisting of equal weight of toluene and tetrahydrofuran. The polybutadiene, after stripping free of solvents and a small quantity of very low molecular weight volatile polymer, had a number average molecular weight of 660.

Two hundred ten grams of the above butadiene homopolymer were diluted with 210 grams of benzene, and the polymer solution thus formed was charged to an autoclave with 84.0 grams of maleic anhydride and heated for 3½ hours at 410° F. to form the polymer adduct. The polymer adduct was cooled and discharged. The resulting adduct was a slightly viscous oil, yellowish in color, having an NVM (nonvolatile materials) content of 62.8 wt. percent. An 87 wt. percent yield of the above adduct was obtained. This polymer adduct was subjected to infrared spectrophotometric evaluation as a solvent free film on a salt plate leading to the following conclusions regarding structure of the adduct:

(1) Absence of broad adsorption bands in the 3–4 micron region indicates the essential absence of —COOH groups.

(2) A very strong band at 5.7 microns and a weaker band at about 5.5 microns are indicative of strained

groups, e.g. in an anhydride ring. It was also established that unreacted maleic anhydride volatizes very readily from the extremely thin, uncovered films in the salt plates. The stable nature of these bands indicates the functional groups to be an integral part of the polymer structure.

(3) Strong bands at 8.2 and 9.4 microns are associated with —C—O— groupings; these bands are essentially absent in the starting polybutadiene.

(4) The unsaturation bands in the original polybutadiene at 10.0 and 10.3 microns (terminal vinyl and trans internal respectively) did not change in relative intensity to each other, but decreased in relative intensity to other very strong bands in the original polymer. This decrease can be accounted for by the dilution effect of the maleic anhydride added to the polybutadiene. This also is evidence that there is no overall consumption of unsaturated linkages in the original polybutadiene by reacting with the maleic anhydride.

(5) No bands were observed attributable to —C=C— conjugated with

This indicates that the unsaturation in the maleic anhydride is consumed in reacting with the polybutadiene.

Partial (one-quarter) esters of these resins are then prepared preferably in the absence of oxygen by reaction of the adduct anhydride rings with about one-quarter (25%) of an equivalent amount of ethyl, butyl, allyl, and decyl alcohols, respectively, sufficient to completely esterify all carboxyl groups present upon ring cleavage (based on the acid number of the adduct), at temperatures ranging from reflux temperatures to about 400° F. under nitrogen blanket for one hour. Another portion of the polymer adduct is subjected to hydrolysis using about 0.07 gram of water per gram of adduct at reflux temperature (approximately 300° F.).

Water-soluble organic (N,N-diethylcyclohexylamine) salts of each of the above partial esters and hydrolyzed adducts, respectively, are then prepared in absence of oxygen by reaction of the calculated amount of N,N-diethylcyclohexyl to form the corresponding triethyl amine salts with all of the remaining (unreacted) carboxyl groups at temperatures of 260 to 360° F. for time periods of 2 to 4 hours using nitrogen blankets. The salts thus obtained were generally completely soluble in water. Each of the above N,N-diethylcyclohexylamine salts of the polybutadiene-maleic anhydride polymer adducts performs satisfactorily both as a glass fiber forming size and finishing size when employed in aqueous solutions (0.5 to 2.0 wt. percent partial ester, or hydrolyzed adduct, N,N-diethyl cyclohexyl amine salt) with 1.0 wt. percent "A–1100" coupling agent, viz., gamma aminopropyl triethoxy silane.

Example 2.—Preparation of typical adducts having chain transfer function

A polybutadiene homopolymer prepared as in Example 1 above, but having a number average molecular weight of 447 and containing an average of one terminal phenyl group per molecule was dissolved in benzene in the ratio of 350 grams of polymer to 300 grams of benzene. The mixture along with 70 grams maleic anhydride (20 wt. percent on polybutadiene) was charged to a stirred autoclave and treated in a nitrogen atmosphere at 365–390° F. for 2½ hours. The product was filtered, and stripped free of solvent. The resulting polybutadiene-maleic anhydride adduct contained approximately 16.67 wt. percent maleic anhydride, the remainder (83.33 wt. percent) being polybutadiene. This adduct was then used to form the ethyl one-quarter and half-ester-N,N-diethyl cyclohexylamine salts, respectively, in accordance with the procedure of Example 1 above, for use as the binder in an aqueous glass fiber finishing size as will be noted in detail in Example 5 hereinbelow.

Example 3.—Preparation of typical adducts having chain transfer function with higher unsaturated polycarboxylic acid anhydride concentration A polybutadiene homopolymer having a number average molecular weight of 447 and averaging one terminal phenyl group per molecule was dissolved in an equal weight of benzene and treated with 40 wt. percent maleic anhydride (on polybutadiene) in a stirred autoclave for 2½ hours at 385–395° F. The product was filtered and stripped free of benzene giving a somewhat viscous yellow polymer adduct. This adduct contained approximately 28.5 wt. percent maleic anhydride with the remainder (71.5 wt. percent) being polybutadiene. This adduct was then employed to form the N,N-diethyl cyclohexyl amine salt and the N,N-diethyl cyclohexyl amine salt-ethyl half ester, respectively, in accordance with the procedure of Example 1 for use as the binder in an aqueous glass fiber finishing size as will be noted in detail in Example 5 below.

Example 4.—Preparation of typical adducts from polybutadiene polymers without terminal chain transfer function Two different adducts were prepared using the same polybutadiene homopolymer, but with different concentrations of maleic anhydride. A polybutadiene homopolymer having a number average molecular weight of approximately 900 and having about 60% of its unsaturation present as pendant vinyl groups (but with no terminal phenyl or other chain transfer group) was dissolved in benzene and charged to an autoclave with 20 and 40 wt. percent respectively, of maleic anhydride (based on polybutadiene).

The 20% adduct reaction was carried out for two hours at 380 to 395° F. and resulted in a polybutadiene-maleic anhydride adduct "A" containing approximately 16.67 wt. percent maleic anhydride with the remainder (83.33 wt. percent) being said polybutadiene. Adduct "A" had a molecular weight of approximately 1063 and contained 7.9 wt. percent oxygen.

The 40% adduct reaction was conducted at 390–395° F. for approximately 2.7 hours and resulted in a polybutadiene-maleic anhydride adduct "B" containing approximately 28.5 wt. percent maleic anhydride with the remainder (71.5 wt. percent) being said polybutadiene. Adduct "B" had a molecular weight of approximately 1104 and contained 11.7 wt. percent oxygen. Adducts "A" and "B" were then employed to form N,N-diethyl cyclohexyl amine salts for use as binders in aqueous glass fiber finishing sizes as will be noted in detail in Example 5 below.

Example 5.—Formation of salts, etc. of the adducts of Examples 2 to 4 and testing as finishing size binders for strip adhesion The below indicated salts of the below specified polybutadiene adducts were prepared in accordance with the water-soluble salt preparation procedure indicated hereinabove in Example 1. These respective salts were then formulated into aqueous glass fiber sizing compositions by dissolving 1 wt. percent "A–1100" coupling agent (gamma-aminopropyl triethoxy silane) and the below indicated concentrations of the respective salts in water at ambient room temperatures (65 to 85° F.).

Unfinished (heat cleaned) "HG–28" woven glass cloth (taffeta weave of 42 by 32 construction) was sized by dipping in the respective aqueous glass fiber sizing solutions followed by air drying at temperatures ranging from room temperatures to 212° F. for time periods ranging from 30 minutes (at 212° F.) to sufficient time to dry the water from the sized fibers (viz. 16 to 48 hours for room temperature air drying).

The dried finished glass fabric samples were each laminated between two 2" x 6" x 0.125" sheets of SBR compound consisting of: 100 weight parts of "SBR 1500" (cold type butadiene-styrene rubber), 50 wt. parts of SRF (semi-reinforcing) carbon black, 5 wt. parts of zinc oxide, 1 wt. part stearic acid, 0.5 wt. part of "Aminox" (a stabilizer which is a reaction product of diphenyl amine and acetone), 10 wt. parts of "Flexon 290" (highly aromatic extender oil having a specific gravity of 0.992 and an aniline point of 107), 2.5 wt. parts sulfur, and 0.4 wt. part "Santocure NS" (N-tert butyl-2-benzothiazole sulfenamide). A strip of Mylar film was placed between the rubber compound and the finished glass fabric on one side about 1 inch in from each end of the laminate to provide an area to clamp the separate laminate parts to test the adhesion between the finished glass fabric and the rubber compound. The laminate was then placed between two 2" x 6" strips of open weave reinforcing fabric (e.g. canvas) to prevent stretching of the rubber during the adhesion test and placed in a cavity mold 2" x 6" x 0.185" at approximately 1000 p.s.i. and cured for 45 minutes at 292° F. After allowing the laminate to cool at room temperature, two 0.5" x 6" strips were cut with a die in a press and tested for cured strip adhesion at 2" per minute jaw separation rate on an Instron tester with the cured laminates at room temperature and at 250° F. in accordance with the procedure of ASTM D413–39.

These cured sandwiches were then evaluated twice each for strip adhesion at room temperature and 250° F. in accordance with ASTM D413–39. The results of this test are tabulated hereinbelow in Table 1. In each case the adhesion of the thus finished glass cloth to the rubber coating compound was very strong and closely approached the cohesive strength of the cured rubber, itself, as evidenced by delamination (separation) occurring partly and sometimes mainly in the rubber near the glass fiber cloth in each instance.

Comparative and control tests were also conducted on unfinished "HG–28" glass fabric (Run 10), "HG–28" fabric finished with a 1.0 wt. percent aqueous solution of "A–1100" alone (Run 11) and with an aqueous sizing composition containing 1.0 wt. percent "A–1100" plus 1.0 wt. percent of an aqueous emulsion of 27.2 wt. percent of a "Buton" butadiene-styrene copolymer (containing 70 mol percent butadiene and 30 mol percent styrene), 0.11 wt. percent "Ethyl 702" (antioxidant), 2.59 wt. percent "Igepal CO–630" (emulsifier) and 0.01 wt. percent "Gantrez AN–139" (water-soluble copolymer of maleic anhydride and vinyl methyl ether), viz. Run 12. The pertinent test data are summarized hereinbelow in Table 1. The reported strip adhesions are those at which delamination occurred.

As will be noted from Table 1, following, the glass fiber sizes containing the water-soluble binders of the present invention (Runs 1 to 9) possess equal or in some cases superior ability to enhance strip adhesion to rubber compared to conventional rubber sizes, e.g. butadiene-styrene copolymers (Run 12) even though present in considerably lesser amounts, viz. 0.5 to 1.0 wt. percent for Runs 1 to 9 versus 4.0 wt. percent for Run 12. The economically meritorious nature of the present invention is believed to be clearly evident.

While the size containing the coupling agent, per se, (Run 11) gave comparable strip adhesions, such a size would be generally unacceptable both as a forming size and a finishing size because it does not contain a binder. As noted hereinbefore, a binder is necessary to ward-off abrasion, filament breakage, etc. during strand formation (in the case of a forming size) and weaving, twisting or other working operations (in the case of a finishing size), or both.

TABLE 1

| Run No. | Adduct of example | Salt | Wt. percent salt in size | Strip adhesion (pounds per inch) at two inches per minute pull rate at— | |
|---|---|---|---|---|---|
| | | | | Room temperature | 250° F. |
| 1 | 4 "A" | N,N-diethyl cyclohexyl amine salt | 0.5 | 59 | 28 |
| 2 | 4 "A" | do | 1.0 | 75 | 39 |
| 3 | 4 "B" | do | 0.5 | 35 | 10 |
| 4 | 4 "B" | do | 1.0 | 38 | 18 |
| 5 | 2 | do | 1.0 | 40 | 15 |
| 6 | 3 | do | 1.0 | 35 | 10 |
| 7 [1] | 2 | Ethyl half ester-N,N-diethyl | 1.0 | 28 | 8 |
| 8 [1] | 3 | Cyclohexyl amine salt | 1.0 | 32 | 10 |
| 9 [1] | 2 | One-quarter ethyl ester-N,N-diethyl cyclohexyl amine salt. | 1.0 | 80 | 26 |
| 10 | | | | [2] 9 | [2] 1 |
| 11 | | | | [3] 41.2 | [3] 12.5 |
| 12 | | | | [4] 41.5 | [3] 10 |

[1] Prepared by reacting the respective adduct with the calculated amount of ethyl alcohol to give the respective half or quarter ester followed by reaction with N,N-diethyl cyclohexyl amine.
[2] Several filaments in glass fabric broke (average of two runs).
[3] Average of four runs.
[4] The glass fabric separated in three of the four runs (average of four runs).

Example 6

This test was conducted to evaluate the ability of a typical water-soluble amine salt to (a) preserve strand integrity (resist filament breakage during handling) while (b) allowing separation between filaments to secure ready access of individual filaments to receive subsequently applied rubber, plastic, resin or similar coatings. Feature (a) is important in both forming and finishing sizes for all applications whereas (b) is especially important in sizing glass fibers which are to be laminated or serve as reinforcement for rubber, plastic resin, etc. The effect of binder concentration was also studied re (a) and (b).

Separate aqueous sizing solutions were prepared containing 0.2, 0.4, 1.0 and 2.0 wt. percent, respectively, of the N,N-diethyl cyclohexyl amine salt of the one-quarter ethyl ester of the maleic anhydride adduct of chain transfer polybutadiene (molecular weight of approximately 447 for polybutadiene) containing approximately 16.67 wt. percent maleic anhydride and 83.33 wt. percent chain transfer polybutadiene. This salt was formed from the adduct of Example 2 above. Each sizing solution also contained 1.0 wt. percent of "A-1100" coupling agent. Varying concentration solutions were prepared to determine the best concentration(s) of this salt which loosely bind the filaments together (to preserve strand integrity) while allowing ready separation of filaments. Only loose binding of the filaments is desired because the sized strands are separated after drying for application of subsequent coatings onto individual filaments (insofar as possible) to resist filament to filament abrasion and breakage (when the strands are in place as reinforcement within the cured or vulcanized rubber, plastic or resin).

"K-37" glass strand was coronized (to remove a previously applied starch forming size) by passing it at a speed of about 100 ft. per minute through three one ft. long ovens maintained at temperatures of 950° F., 1000° F., and 1500° F., respectively. Then the heat cleaned strands were passed over three chrome plated rollers (4 inches wide by 3 inches in diameter) wet with the respective sizing solutions. All three rollers were driven separately to separate the filaments (approximately 200 per strand) to aid in coating each individual filament. The sized strands were then dried by passage through a series of six one-foot long drying ovens at temperatures of 450 to 600° F. The thus dried strands were then wound onto 3.5 inch diameter cylinders 9.5 inches long. Then the dried, sized strands were tested for ease of separation by cutting a short length of the strand and applying light finger pressure to the cut end by tapping. The ease of filament separation was observed along with filament breakage.

The 1.0 wt. percent sizing solution performed the best of those tested. It allowed ready separation of the strand filaments yet preserved strand integrity by loosely binding the filaments together.

The 0.2 and 0.4 wt. percent sizing solutions allowed ready filament separation, but did not satisfactorily bind the filaments together sufficiently to maintain strand integrity. The 0.4 wt. percent solution was better than the 0.2 wt. percent solution however.

The 2.0 wt. percent sizing solution bound the filaments together too tightly for easy separation.

Thus it was concluded that the optimum concentrations of this particular amine salt of the polymer adduct for use in forming sizes for glass fibers was >0.4 wt. percent but <2.0 wt. percent.

Suitable exemplary natural or synthetic elastomers, resins, plastics, etc., with which glass fibers sized in accordance with this invention can be laminated and molded include, but are not limited to, the following: butyl rubber (copolymers of 70 to 99.5 wt. parts of a C4 monoolefin, e.g. isobutylene and 30 to 0.5 wt. parts of a diolefin, e.g. butadiene, isoprene, dimethyl butadiene, piperylene, pentadienes, etc.); natural rubber; vinyl chloride polymers and copolymers; polyamides such as the conventional nylon molding plastics and polymers; urea-formaldehyde resins, melamine-formaldehyde resins, phenol formaldehyde resins, and other thermosetting resins; epoxy resins; silicone and siloxane polymers and resins; etc.

While the above examples illustrate the invention in great detail, it should be understood that the present invention in its broadest aspects is not necessarily limited to the specific materials, conditions and procedures shown in the examples. The present invention is limited only by the claims which follow.

What is claimed is:

1. A method for treating glass fibers which comprises applying to said fibers an aqueous sizing composition containing a water-soluble binder comprising a polymer adduct salt selected from the group consisting of:
   (1) organic amine and ammonium salts of unsaturated polycarboxylic acid anhydride adducts of butadiene polymers, said butadiene polymers having a molecular weight ranging from about 300 to about 4,000,
   (2) the monoamide partial organic amine salts of said adducts wherein said organic amide contains a primary or secondary organic group, and
   (3) the partial organic ester-partial organic amine and ammonium salts of said adducts;
said salts having a molecular weight ranging from about 500 to about 6,000; and drying said sized glass fibers.

2. A method as in claim 1 wherein said aqueous sizing composition includes a silane coupling agent.

3. A method as in claim 1 wherein said butadiene polymer is a polybutadiene homopolymer.

4. A method as in claim 1 wherein said butadiene polymer is a copolymer of butadiene with at least one monomer copolymerizable therewith.

5. A method as in claim 1 wherein said adduct contains from 0.5 to about 10 polyfunctional anhydride salt groups per molecule of butadiene polymer.

6. Sized glass fibers comprising individual glass fibers having a coating thereon of a binder comprising a water-soluble polymer adduct salt selected from the group consisting of:

(1) organic amine and ammonium salts of unsaturated polycarboxylic acid anhydride adducts of butadiene polymers, said butadiene polymers having a molecular weight ranging from about 300 to about 4,000, (2) the monoamide partial organic amine salts of said adducts wherein said organic amide contains a primary or secondary organic group, and (3) the partial organic ester-partial organic amine and ammonium salts of said adducts;

said salts having a molecular weight ranging from about 500 to about 6,000.

7. A laminated article comprising the sized glass fibers of claim 6 adhered to a lamina material selected from the group consisting of rubber, plastic or resin.

8. A glass fiber reinforced molded article comprising at least one member selected from the group consisting of rubber, plastic and resin containing as a reinforcing element therein sized glass fibers of claim 6.

9. A method for treating glass fibers which comprises coating said fibers with an aqueous sizing composition containing a silane coupling agent and a water-soluble binder comprising an organic amine or ammonium salt of an unsaturated dicarboxylic acid anhydride-butadiene polymer adduct containing at least one pendant polyfunctional group selected from the group consisting of:

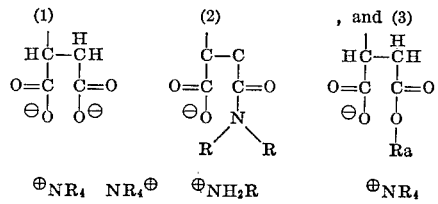

wherein the R groups are selected from the group consisting of hydrogen, hydroxyl, alkyl, aryl, alkaryl, alkenyl or heterocyclic, and Ra is an organic group containing from 1 to 20 carbon atoms, and wherein the molecular weight of said butadiene polymer ranges from about 300 to about 4,000 and the molecular weight of said polymer adduct salt ranges from about 500 to about 6,000.

10. A method as in claim 9 wherein said butadiene polymer contains a terminal mononuclear aromatic group of the formula:

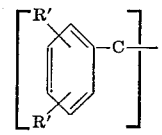

where R' is a member selected from the group consisting from hydrogen or $C_1$ to $C_8$ alkyl groups.

11. A method as in claim 9 wherein said aqueous sizing composition contains from about 0.1 to about 10 wt. percent of said water-soluble binder.

12. A method as in claim 9 wherein said unsaturated dicarboxylic acid anhydride is maleic anhydride.

13. A method as in claim 9 wherein said butadiene polymer is a polybutadiene homopolymer.

14. A method as in claim 9 wherein said butadiene polymer is a copolymer of butadiene with at least one monomer copolymerizable therewith.

15. Sized glass fibers comprising individual glass fibers having a coating thereon of a water-soluble binder comprising an organic amine or ammonium salt of an unsaturated dicarboxylic acid anhydride-butadiene polymer adduct containing at least one pendant polyfunctional group selected from the group consisting of:

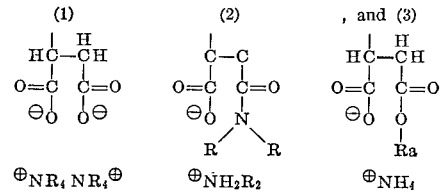

wherein the R groups are selected from the group consisting of hydrogen, hydroxyl, alkyl, aryl, alkaryl, aralkyl, alkenyl or heterocyclic, and Ra is an organic group containing from 1 to 20 carbon atoms, and wherein the molecular weight of said butadiene polymer ranges from about 300 to about 4,000 and the molecular weight of said polymer adduct salt ranges from about 500 to about 6,000.

References Cited
UNITED STATES PATENTS

| | | | |
|---|---|---|---|
| 2,884,394 | 4/1959 | Silver | 117—126 |
| 3,097,963 | 7/1963 | Caroselli et al. | 117—126 |

ALFRED L. LEAVITT, *Primary Examiner.*

H. COHEN, *Assistant Examiner.*